(12) United States Patent
Park et al.

(10) Patent No.: US 7,220,517 B2
(45) Date of Patent: May 22, 2007

(54) SOLID ELECTROLYTE AND BATTERY EMPLOYING THE SAME

(75) Inventors: Young-sin Park, Kyungki-do (KR); Seok-soo Lee, Kyungki-do (KR); Young-gu Jin, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 326 days.

(21) Appl. No.: 10/656,180

(22) Filed: Sep. 8, 2003

(65) Prior Publication Data

US 2004/0101761 A1  May 27, 2004

(30) Foreign Application Priority Data

Nov. 27, 2002  (KR) .................. 10-2002-0074362

(51) Int. Cl.
*H01M 6/18* (2006.01)
(52) U.S. Cl. .................. 429/304; 429/322; 429/189; 429/188; 252/62.2
(58) Field of Classification Search .............. 429/304, 429/231.95, 322, 189, 188; 282/62.2
See application file for complete search history.

(56) References Cited

U.S. PATENT DOCUMENTS

| | | | | |
|---|---|---|---|---|
| 4,555,456 A | * | 11/1985 | Kanehori et al. | 429/131 |
| 4,572,873 A | * | 2/1986 | Kanehori et al. | 428/432 |
| 4,645,726 A | * | 2/1987 | Hiratani et al. | 429/304 |
| 4,906,537 A | * | 3/1990 | Hotomi et al. | 429/310 |
| RE34,469 E | * | 12/1993 | Cogan et al. | 359/269 |
| 5,338,625 A | | 8/1994 | Bates et al. | |
| 5,755,940 A | * | 5/1998 | Shindo | 204/424 |
| 6,770,176 B2 | * | 8/2004 | Benson et al. | 204/192.22 |

FOREIGN PATENT DOCUMENTS

| JP | 08-239218 | 9/1996 |
|---|---|---|
| KR | 1020020063681 A | 8/2002 |

OTHER PUBLICATIONS

Birke et al, "Materials for lithium thin-film batteries for application in silicon technology," *Solid State Ionics* 93, pp. 1-15 (1997).
Nam-Seok Roh et al., "Effects of Deposition Condition on the Ionic Conductivity and Structure of Amorphous Lithium Phosphorus Oxynitrate Thin Film", Scripta Mater, 2000, pp. 43-48, vol. 42, Elsevier Science LTD.
H. Ohtsuka et al., "Application of L120-V205-S102 Solid Electrolyte film to a Rechargeable Lithium Battery", Process in Batteries & Solar Cells, 1989, pp. 108-112, vol. 8, JEC Press Inc., Cleveland, Ohio, USA.
Copy of European Search Report for corresponding application No. 03255187.1-2119.

\* cited by examiner

*Primary Examiner*—Laura Weiner
(74) *Attorney, Agent, or Firm*—Buchanan Ingersoll & Rooney PC

(57) ABSTRACT

A solid electrolyte, a method of manufacturing the same, and a lithium battery and a thin-film battery that employ the solid electrolyte are provided. The solid electrolyte contains nitrogen to enhance the ionic conductivity and electrochemical stability of batteries.

8 Claims, 2 Drawing Sheets

SOLID ELECTROLYTE AND BATTERY EMPLOYING THE SAME

BACKGROUND OF THE INVENTION

This application claims priority from Korean Patent Application No. 2002-74362, filed on Nov. 27, 2002, in the Korean Intellectual Property Office, the disclosure of which is incorporated herein in its entirety by reference.

1. Field of the Invention

The present invention relates to a solid electrolyte and a battery employing the solid electrolyte, and more particularly, to a solid electrolyte with improved ionic conductivity and electro-chemical stability and a lithium battery and a thin-film battery that employ the same.

2. Description of the Related Art

With rapid advance in computer technology and the mobile communications field, the development of digital, smaller, and multimedia information devices have been accelerated. Lithium batteries, which are lightweight and have high energy density, are taking the initiative in the market as an energy source of typical portable information devices, such as notebook personal computers, personal digital assistants (PDAs), mobile phone terminals.

The size of batteries can be a limiting factor to the minimization of such electronic information devices. For example, the size of complementary metal oxide semiconductors (CMOS), smart integrated circuits (ICs), micro-sensors, micro-robots are limited by the size of their battery. Based on the advances in semiconductor manufacturing processes and micro-electro mechanical systems (MEMS), the use of thin-film batteries as an energy source for next-generation micro-systems is expected to increase.

FIG. 1 shows the structure of a conventional thin-film battery. Referring to FIG. 1, a conventional thin-film battery basically includes a cathode 12, an electrolyte 14, and an anode 13, which are sequentially deposited as films on a current collector 11. The conventional thin-film battery has a thickness of about 10 μm.

Since the anode 13 is arranged close to the cathode 12, the conventional thin-film battery has advantages of higher current density, higher battery efficiency, and shorter migration distance of ions. Since ions can migrate across the battery more easily and rapidly, the amount of reactants can be cut down greatly. Another advantage of the conventional thin-film battery is that it is easier to vary the shape and size of batteries for particular purposes. Therefore, thin-film batteries are considered to be the most promising main power source for micro-electronic devices, MEMS devices, micro-sensors.

Thin-film batteries are manufactured by the same method as semiconductor manufacturing processes. Accordingly, a thin-film battery may be mounted as a back-up power source along with electronic circuits in a semiconductor chip such as a complementary metal oxide semiconductor memory chip. In other words, the dead space of electronic devices can be minimized with maximum space utilization efficiency when a thin-film battery is incorporated. Various batteries with different voltage and capacitance can be implemented through proper designing and etching for serial and parallel connections, and thus they have wide applications.

Unlike conventional lithium ion batteries, thin-film batteries require a perfect solid $Li^+$ conducting electrolyte. Electrolyte materials, such as LiSiCON, $Li_4SiO_4$—$Li_3PO_4$ solid solution, $Li_2O$—$B_2O_3$—$SiO_2$, Lipon (lithium phosphorous oxynitride), etc. are considered to be suitable for thin-film batteries.

Although the above-listed crystalline solid electrolytes are known as having effective $Li^+$ conductivity, inorganic compounds with complex crystalline structure are amorphous when deposited as a thin film and require high temperature thermal treatment for crystallization. Therefore, it is impractical to apply such inorganic compounds to manufacture thin-film batteries.

In contrast, glass electrolytes with high isotropic conductivity in amorphous state are easier to process into thin film form compared to crystalline electrolytes. The ionic conductivity of glass electrolytes varies depending on their composition, and the composition of thin film electrolytes can be easily adjusted during deposition. In addition, in thin-film batteries whose electrodes are spaced merely several micrometers apart, as low ionic conductivity as $10^{-7}$ S/cm is satisfactory for battery formation. Therefore, the comparatively low ionic conductivity of glass solid electrolytes is not important in thin-film batteries.

The currently most attractive solid electrolyte for thin-film batteries is Lipon, which is disclosed by John B. Bates et al. in U.S. Pat. No. 5,338,625, entitled "Thin film Battery and Method for making the Same." The LiPON solid electrolyte, which is manufactured with a $Li_3PO_4$ target by radio frequency sputtering in a nitrogen atmosphere, has a high ionic conductivity of $2(\pm 1) \times 10^{-6}$ S/cm. In addition, the Lipon solid electrolyte forms a very stable interface with an anode or a cathode and allows the battery to less deteriorate during operation. The Lipon solid electrolyte satisfies most requirements for use in thin-film batteries employing a solid electrolyte.

However, the properties of the Lipon thin film are greatly dependent on processing parameters for thin film formation and the Lipon thin film lacks reproducibility (P. Birke et al., Materials for thin film batteries for application in silicon technology, Solid State Ionics 93 (1997), 1–15). For this reason, considerable time is required to solve such above-described problems before Lipon thin films can be mass produced.

Therefore, for the development of thin-film batteries as a powerful energy source of $21^{st}$ century leading micro-systems, it is essential to develop glass solid electrolytes with improved ionic conductivity.

SUMMARY OF THE INVENTION

The present invention provides a solid electrolyte for high capacity thin-film lithium secondary batteries with higher charging/discharging rate and energy output and extended cycle life, the solid electrolyte having higher ionic conductivity than general oxide glass electrolytes.

The present invention also provides a method of manufacturing the solid electrolyte.

The present invention also provides a high capacity lithium battery and thin-film battery that employ the solid electrolyte and has higher charging/discharging rate and energy output and extended cycle life.

In accordance with an aspect of the present invention, there is provided a solid electrolyte of formula (1) below:

$$Li_xSi_yM_zO_vN_w \qquad (1)$$

where $0.3 \leq x \leq 0.46$, $0.05 \leq y \leq 0.15$, $0.016 \leq z < 0.05$, $0.42 \leq v < 0.5$, $0 \leq w \leq 0.029$, and M is at least one selected from the group consisting of Nb, Ta, P, and W.

In accordance with another aspect of the present invention, there is provided a method of manufacturing the above solid electrolyte using $Li_2O$, $SiO_2$, and at least one selected from the group consisting of $Nb_2O_5$, $Ta_2O_5$, $WO_3$, and $Li_3PO_4$ as source materials by one of simultaneous sputtering, electron beam deposition, ion beam deposition, and chemical vapor deposition. In the manufacture of the solid electrolyte, a reactant gas containing nitrogen may be used.

In accordance with another aspect of the present invention, there are provided a lithium battery and a thin-film battery that employ the above solid electrolyte.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
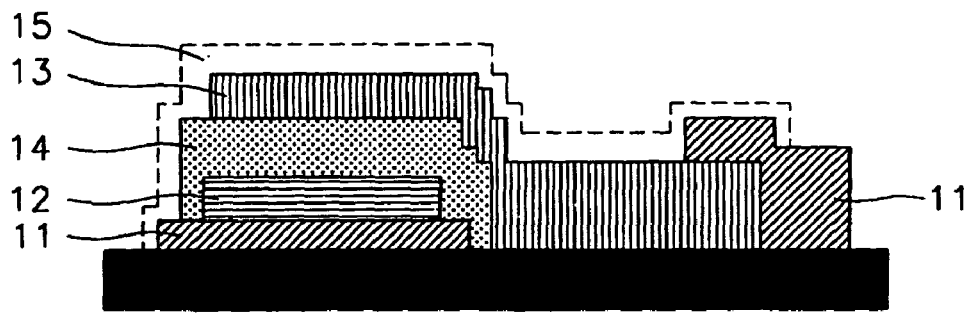
FIG. 1 shows the structure of a conventional thin-film battery.

In general, network formers can form glass alone and may be oxides of Si, P, B, Ge, As, and the like and calcogenides. Glass consists of oxygen polyhedron chains with network former ions. When $Li_2O$ is added as a network modifier, two non-bridging oxygen atoms occur and two $Li^+$ ions approach the non-bridging oxygen atoms for electrical neutrality. As a result, the continuous network structure of the $SiO_4$ polyhedrons is damaged to some extent and viscosity and glass transition temperature are reduced.

Such a structural change in glass by the addition of $Li_2O$ is more significant in terms of ionic conductivity. Ionic conductivity mainly originates from network modifier ions that have higher mobility than the covalently bonded network former ions. Considering the mobility of $Li^+$ ions and the local neutral condition near the non-bridging oxygen atoms, the migration of the $Li^+$ ions when an electric field is applied can be interpreted as being a result of the ions hopping between the non-bridging oxygen atoms. Therefore, in order to improve the ionic conductivity of glass solid electrolytes, higher charge carrier concentration and lower conduction activation energy are necessary.

The ionic conductivity is greatly increased by adding a small amount of the network modifier $Li_2O$. The $Li_2O$ seems to increase the total concentration of conductive $Li^+$ ions and to destroy the glass network structure strongly bonded by covalent bonds. Conduction activation energy includes a strain energy term, which is determined by the size of gap between the non-bridging oxygen atoms, and an electrostatic energy term, which arises from the attraction and repulsion generated when $Li^+$ ions pass through the glass network structure including both positive and negative ions.

Therefore, in order to improve the conductivity of $Li^+$ ions, controlling the spatial and electrostatic structures of glass is most important. According to the present invention, it is attempted to improve the conductivity of $Li^+$ ions by adding oxides, such as $Nb_2O_5$, $Ta_2O_5$, $WO_3$, $Li_3PO_4$, and the like.

When oxides, such as $Nb_2O_5$, $Ta_2O_5$, $WO_3$, $Li_3PO_4$, and the like, are added into a $Li_2O$—$SiO_2$ solid electrolyte, the glass has a more open structure, activation energy is reduced, and ionic conductivity is improved.

In particular, according to the present invention, a third oxide is added into a $Li_2O$—$SiO_2$ solid electrolyte to modify the glass structure of the electrolyte to induce effective ionic conduction. A structural change of the glass electrolyte by the additive can be understood by modeling an ionic potential of the additive as Z/r, where Z denotes the atomic number of the ion and r denotes the ionic diameter. The network structure of pure glass, without an additive, is a random but balanced array of covalently bonded polyhedrons. However, the greater the ionic potential of a material added to the glass is, the more neighboring ions, in the glass, within a predetermined distance are effected by an electrostatic force and the more unbalanced the network structure becomes. As a result, the glass structure is greatly modified.

A solid electrolyte according to the present invention is manufactured by adding at least one third additive selected from the group consisting of $Nb_2O_5$, $Ta_2O_5$, $WO_3$, and $Li_3PO_4$, to a $Li_2O$—$SiO_2$ solid electrolyte. Optionally, nitrogen gas is flowed into the solid electrolyte. The solid electrolyte according to the present invention has formula (1) below:

$$Li_xSi_yM_zO_vN_w \qquad (1)$$

where $0.3 \leq x \leq 0.46$, $0.05 \leq y \leq 0.15$, $0.016 \leq z < 0.05$, $0.42 \leq v < 0.5$, $0 \leq w \leq 0.029$, and M is at least one selected from the group consisting of Nb, Ta, P, and W.

In the solid electrolyte, if the mole ratio of lithium (Li) to the other components, expressed by x, is less than 0.3, the amount of mobile lithium ions is too low and the ionic conductivity is very small. If the mole ratio of lithium is greater than 0.46, the glass structure is excessively damaged and phase separation or partial or full crystallization occurs, so that a perfect glass phase cannot be formed.

If the mole ratio of silicon (Si) to the other components, expressed by y, is less than 0.05, the amount of $SiO_2$ is too small to form a glass phase. If the mole ratio of silicon is greater than 0.15, the relative amount of $Li_2O$, which contributes to ionic conduction, is reduced and ionic conductivity is lowered.

M in formula (1) above denotes a third additive compound selected from among Nb, Ta, P, and W. The third additive compound is added in oxide form, i.e., $Nb_2O_5$, $Ta_2O_5$, $WO_3$, or $Li_3PO_4$. If the mole ratio of M to the other components, expressed by z, is less than 0.016, the addition effect is trivial. If the mole ratio of M is greater than 0.05, phase separation occurs. A preferred compound for M is Nb. Nb can effectively reduce the above-described strain energy term and the electrostatic energy term, which arises from the attraction and repulsion generated when conductive ions pass the glass network including both positive and negative ions.

Alternatively, a nitrogen atom may be added in the manufacture of the solid electrolyte according to the present invention to further enhance the ionic conductivity. This effect can be explained by reduction in ionic conduction activation energy due to a difference in electronegativity between nitrogen (=3.04) and oxygen (=3.44). In particular, nitrogen has a smaller electronegativity than oxygen and forms a stronger covalent bond with silicon. As a result, the electrostatic attraction of nitrogen to lithium ions is reduced and the ionic conductivity of the solid electrolyte is improved.

The present invention also provides a method of manufacturing the solid electrolyte. Any methods, such as simultaneous sputtering, electron beam deposition, ion beam deposition, chemical vapor deposition, and the like, can be applied to manufacture the solid electrolyte according to the present invention.

In the manufacture of the solid electrolyte, reactant gas may be partially or fully replaced with nitrogen gas to incorporate nitrogen into the solid electrolyte. For example, when simultaneous sputtering is applied to form the solid electrolyte, separate $Li_2O$, $SiO_2$, and $Nb_2O_5$ ceramic targets are simultaneously sputtered with Ar and $O_2$ gases serving as reactants, to form the solid electrolyte as a thin film. The reactant gases may be partially or fully replaced with $N_2$ gas to incorporate into nitrogen into the thin film.

The present invention also provides a lithium secondary battery and a thin-film battery that employ the solid electrolyte.

As an example of manufacturing a lithium battery using the solid electrolyte according to the present invention, a cathodic collector is coated with an active material composition, $V_2O_5$, $LiMn_2O_4$, $LiCoO_2$, $LiNiO_2$, or $MoO_3$, and dried to form a cathode with a cathode active material layer. Separately, an anode active material, such as lithium metal, a lithium alloy, or graphite, is applied to an anodic collector by roll pressing, to form an anode with an anode active material layer. A plurality of stacks of the cathode, the solid electrolyte described above, the anode are stacked upon one another and sealed in a vacuum to provide a lithium secondary battery.

As an example of manufacturing a thin-film battery using the solid electrolyte according to the present invention, a cathode active material, such as $V_2O_5$, $LiMn_2O_4$, $LiCoO_2$, $LiNiO_2$, or $MoO_3$, is vacuum deposited on a current collector. Next, the solid electrolyte is deposited on the cathode active material layer in a vacuum. An anode active material, such as lithium metal, a lithium alloy, a silicon alloy, or a tin alloy, is deposited on the solid electrolyte by thermal deposition or spurring, to provide a thin-film battery.

The present invention will be described in greater detail with reference to the following examples. The following examples are for illustrative purposes and are not intended to limit the scope of the invention.

EXAMPLE 1

A solid electrolyte thin film having a thickness of 4,000 Å was manufactured on a silicon substrate using $Li_2O$, $SiO_2$, and $Nb_2O_5$ targets, which were 2 inches in diameter.

After adjusting the initial vacuum level below $2\times10^{-6}$ torr, argon gas was supplied at 10 mTorr and 20 sccm at a radio frequency (RF) power of 60 W to deposit a platinum (Pt) thin film having a thickness of 1000 Å on the silicon substrate. Next, the $Li_2O$, $SiO_2$, and $Nb_2O_5$ targets were simultaneously sputtered in an argon-oxygen (16:4 in sccm) atmosphere at 5 mTorr, to form a 4000-Å-thick thin film on the Pt thin film.

RF power applied to each of the $Li_2O$, $SiO_2$, and $Nb_2O_5$ targets was adjusted within a range of 30 ~120 W to manufacture thin films having different compositions. To measure the ionic conductivity of the solid electrolyte thin films having different compositions, on each of the solid electrolyte thin films a Pt thin film was deposited to a thickness of 1000 Å by supplying argon gas at 10 mTorr and 20 sccm over a hard mask, which was placed on the solid electrolyte thin film, at an RF power of 60 W.

Cells having a size of 5 mm×5 mm were manufactured with the solid electrolyte thin films, and ionic conductivity was measured by applying a current across two blocking electrodes using an impedance analyzer (IM6). The ionic conductivities of the solid electrolytes containing $Li_2O$, $SiO_2$, and $Nb_2O_5$ in different mole ratios are shown in Table 1.

TABLE 1

| Composition (mol %) | | | Ionic Conductivity |
|---|---|---|---|
| $Li_2O$ | $SiO_2$ | $Nb_2O_5$ | (S/cm) |
| 16 | 67 | 16 | $3.4 \times 10^{-9}$ |
| 58 | 13 | 29 | $5.7 \times 10^{-8}$ |
| 58 | 29 | 13 | $1.8 \times 10^{-7}$ |
| 67 | 16 | 16 | $2.2 \times 10^{-7}$ |
| 65 | 30 | 5 | $2.9 \times 10^{-7}$ |
| 70 | 20 | 10 | $5.0 \times 10^{-7}$ |
| 70 | 25 | 5 | $4.0 \times 10^{-7}$ |

As is apparent from Table 1, the ionic conductivity is greater for electrolyte thin films containing more $Li_2O$. For electrolyte thin films containing the same amount of $Li_2O$, the ionic conductivity is smaller for the electrolyte thin film containing less $Nb_2O_5$. The ionic conductivity is greatest for the electrolyte thin film containing $Li_2O$, $SiO_2$, and $Nb_2O_5$ in a mole ratio of 70:20:10, at about $5\times10^{-7}$ S/cm.

EXAMPLE 2

In order to further enhance the ionic conductivity of the electrolyte thin film containing $Li_2O$, $SiO_2$, and $Nb_2O_5$ in a mole ratio of 70:20:10, which was greatest at about $5\times10^{-7}$ S/cm among the other electrolyte thin films of Example 1, the reactant gases for simultaneous sputtering were replaced partially or fully with nitrogen under the same sputtering conditions as in Example 1. The total flow rate of the reactant gases was 20 sccm, and the partial flow rate of nitrogen gas was varied in a range from 2 to 20 sccm.

Figure 2:
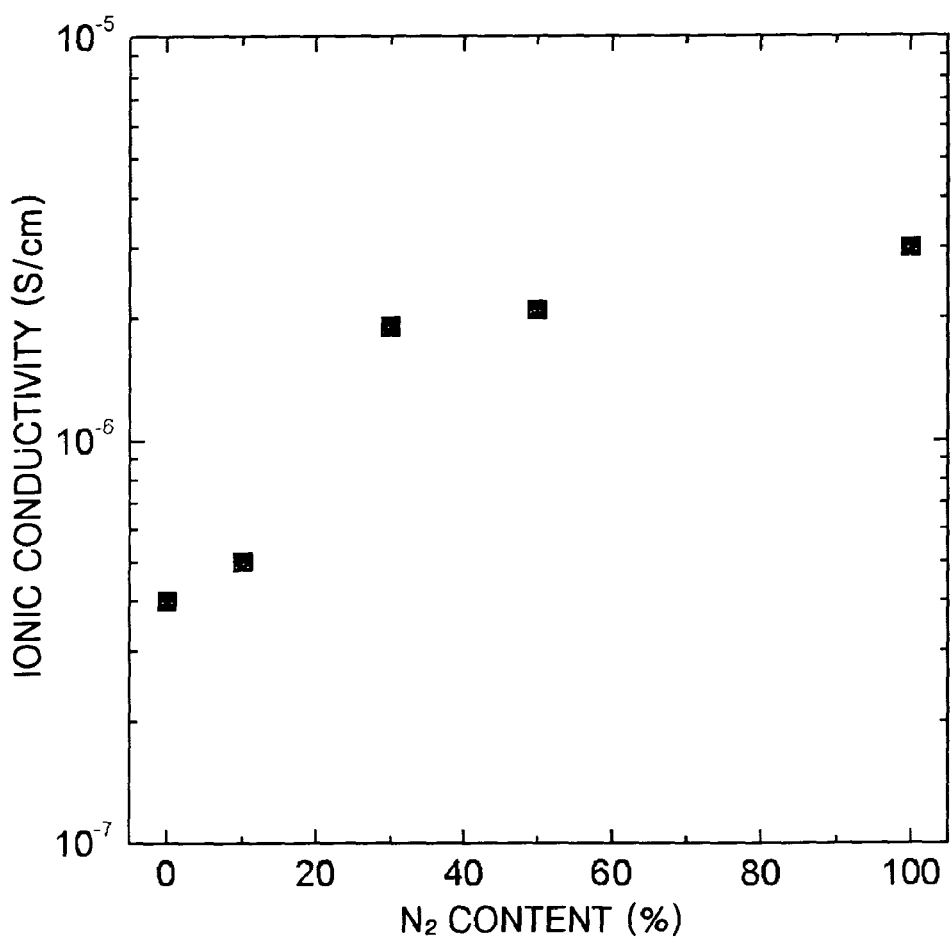
FIG. 2 is a graph of ionic conductivity versus nitrogen content for solid electrolytes containing $Li_2O$, $SiO_2$, and $Nb_2O_5$ in a mole ratio of 70:35:5, which were manufactured in Example 2 according to the present invention.

Change in ionic conductivity with respect to flow rate of nitrogen gas for electrolyte thin films containing $Li_2O$, $SiO_2$, and $Nb_2O_5$ in a mole ratio of 70:20:10 is shown in Table 2 and FIG. 2.

TABLE 2

| Used Gas | | | Ionic Conductivity |
|---|---|---|---|
| Ar | $O_2$ | $N_2$ | (S/cm) |
| 16 | 4 | — | $4.0 \times 10^{-7}$ |
| 16 | 2 | 2 | $5.0 \times 10^{-7}$ |
| 14 | — | 6 | $1.9 \times 10^{-6}$ |
| 10 | — | 10 | $2.1 \times 10^{-6}$ |
| — | — | 20 | $3.0 \times 10^{-6}$ |

As is apparent from Table 2, the ionic conductivity is increased when a small amount of nitrogen is added. The ionic conductivity is increased above eight times when only nitrogen gas is supplied.

Figure 3:
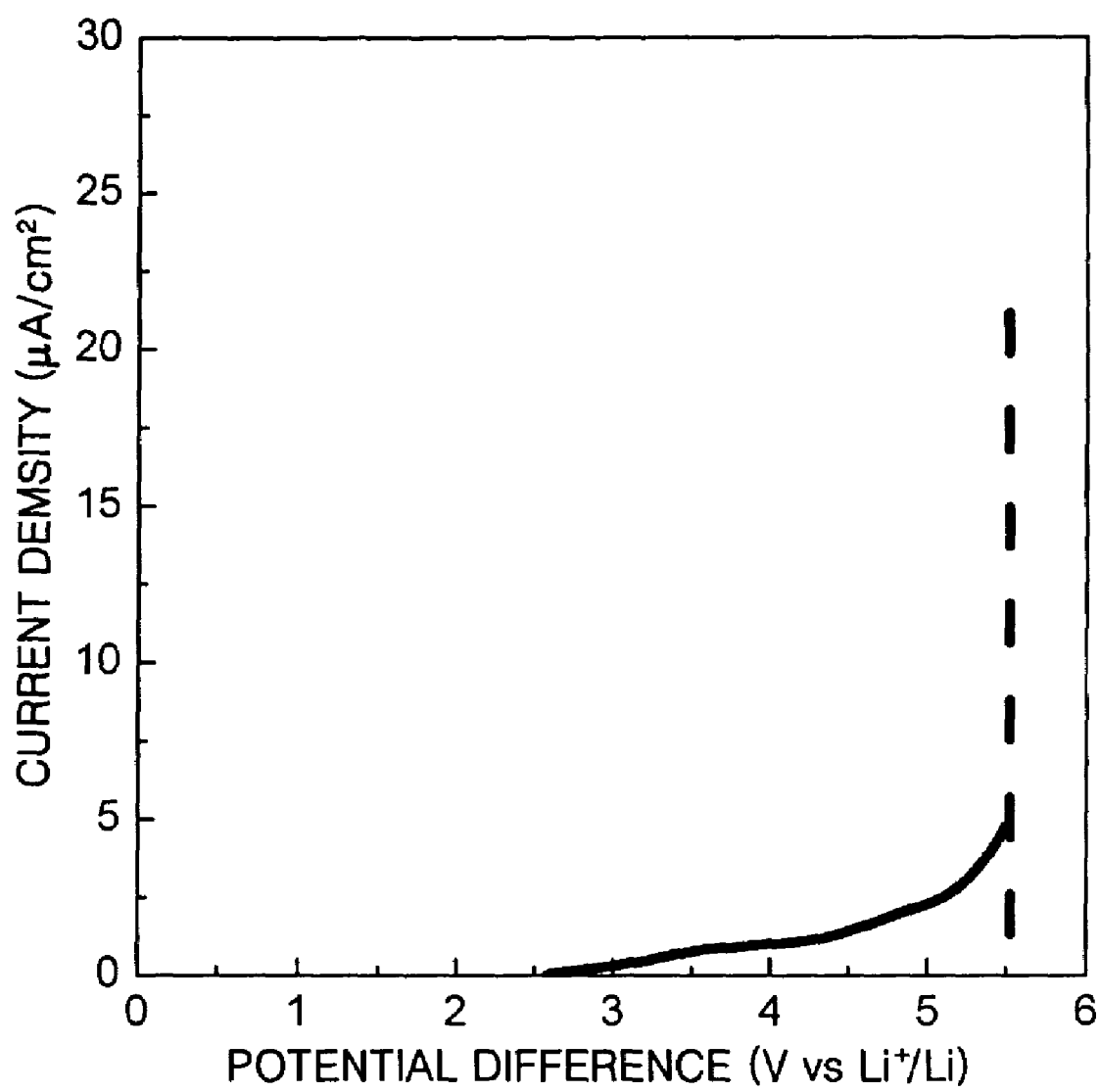
FIG. 3 is a graph of current density versus potential difference illustrating a chemically stable potential range for batteries with solid electrolytes manufactured in Example 2 according to the present invention.

In order to determine an electrochemically stable potential range of a lithium secondary battery employing the nitrogen-containing solid electrolyte of Example 2, lithium was deposited by thermal evaporation to form a counter electrode on the solid electrolyte thin film. A potential ranging from 0 V to 6 V was applied across the lithium electrode using a Potentiostat (EG & G 263A) to measure current density. The results are shown in FIG. 3. In FIG. 3, the current density does not exceed 5 $\mu A/cm^2$ at a potential level up to 5.5 V (vs $Li/Li^+$). As a result, the electrochemically stable potential range is determined to be in a range of 0–5.5V (vs $Li/Li^+$).

In addition, oxide-based solid electrolyte thin films, which had different compositions as in Example 1, were manufactured in the same manner as in Example 1, except that only nitrogen gas was supplied as a reactant gas during deposition to enhance ionic conductivity. The results are shown in Table 3.

TABLE 3

| Composition (mol %) | | | Ionic Conductivity |
|---|---|---|---|
| $Li_2O$ | $SiO_2$ | $Nb_2O_5$ | (S/cm) |
| 70 | 25 | 5 | $3.0 \times 10^{-6}$ |
| 70 | 20 | 10 | $2.5 \times 10^{-6}$ |
| 67 | 16 | 16 | $2.0 \times 10^{-6}$ |
| 60 | 35 | 5 | $2.7 \times 10^{-6}$ |
| 60 | 30 | 10 | $2.8 \times 10^{-6}$ |
| 50 | 45 | 5 | $1.5 \times 10^{-6}$ |
| 50 | 40 | 10 | $2.2 \times 10^{-6}$ |
| 50 | 34 | 16 | $1.8 \times 10^{-6}$ |

As is apparent from Table 3, the solid electrolyte thin films, which have the formula of $Li_xSi_yNb_zO_vN_w$ where $0.3 \leq x \leq 0.46$, $0.05 \leq y \leq 0.15$, $0.016 \leq z < 0.05$, $0.42 \leq v < 0.5$, and $0 \leq w \leq 0.029$, have an ionic conductivity greater than $1.0 \times 10^{-6}$ S/cm.

The amounts of Li, Si, and Nb in the solid electrolyte thin films were measured using inductive coupled plasma-atomic emission spectroscopy (ICP), and the amounts of oxygen and nitrogen were measured using x-ray photoelectron spectroscopy (XPS).

Evidently, in the oxide-based solid electrolytes with various compositions, their ionic conductivity can be improved greatly by adding a small amount of nitrogen.

EXAMPLE 3

Oxide-based solid electrolyte thin films containing nitrogen were manufactured in the same manner as in Example 2, except that $Li_3PO_4$ instead of $Nb_2O_5$ was used. Change in ionic conductivity with respect to composition of the solid electrolytes is shown in Table 4.

TABLE 4

| Composition (mol %) | | | Ionic Conductivity |
|---|---|---|---|
| $Li_2O$ | $SiO_2$ | $Li_3PO_4$ | (S/cm) |
| 70 | 25 | 5 | $1.1 \times 10^{-6}$ |
| 60 | 35 | 5 | $1.5 \times 10^{-6}$ |
| 50 | 34 | 16 | $2.1 \times 10^{-6}$ |

As is apparent from Table 4, all of the electrolytes have an ionic conductivity greater than $1.0 \times 10^{-6}$ S/cm.

As described above, a solid electrolyte according to the present invention contains nitrogen and has improved lithium ion conductivity and electrochemical stability. With such a solid electrolyte according to the present invention, longer lifespan lithium secondary batteries or thin-film batteries with higher charging/discharging rate, improved charging/discharging cycle properties, and a more chemically stable interface between the electrolyte and their electrode can be manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A solid electrolyte having the formula of $Li_xSi_yM_zO_vN_w$ where $0.3 \leq x \leq 0.46$, $0.05 \leq y \leq 0.15$, $0.016 \leq z < 0.05$, $0.42 \leq v < 0.5$, $0 < w \leq 0.029$, and M is at least one selected from the group consisting of Nb, Ta, and W.

2. A method of manufacturing the solid electrolyte of claim 1 using targets consisting essentially of $Li_2O$, $SiO_2$, and at least one selected from the group consisting of $Nb_2O_5$, $Ta_2O_5$, and $WO_3$, together with nitrogen gas, as source materials by one of simultaneous sputtering, electron beam deposition, ion beam deposition, and chemical vapor deposition.

3. A lithium battery employing the solid electrolyte of claim 1.

4. A thin-film battery employing the solid electrolyte of claim 1.

5. A solid electrolyte having the formula of $Li_xSi_yM_zO_vN_w$ where $0.3 \leq x \leq 0.46$, $0.05 \leq y \leq 0.15$, $0.016 \leq z < 0.05$, $0.42 \leq v < 0.5$, $0 < w \leq 0.029$, and M is Nb.

6. A method of manufacturing the solid electrolyte of claim 5 using targets consisting essentially of $Li_2O$, $SiO_2$, and $Nb_2O_5$ together with nitrogen gas, as source materials by one of simultaneous sputtering, electron beam deposition, ion beam deposition, and chemical vapor deposition.

7. A lithium battery employing the solid electrolyte of claim 5.

8. A thin-film battery employing the solid electrolyte of claim 5.

* * * * *